(12) United States Patent
Hasegawa et al.

(10) Patent No.: US 8,828,568 B2
(45) Date of Patent: Sep. 9, 2014

(54) FUEL CELL SYSTEM

(75) Inventors: Takahiko Hasegawa, Toyota (JP);
Toshihiko Minamii, Nissin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 268 days.

(21) Appl. No.: 13/203,902

(22) PCT Filed: Jul. 29, 2009

(86) PCT No.: PCT/JP2009/063490
§ 371 (c)(1),
(2), (4) Date: Sep. 26, 2011

(87) PCT Pub. No.: WO2011/013213
PCT Pub. Date: Feb. 3, 2011

(65) Prior Publication Data
US 2012/0121941 A1    May 17, 2012

(51) Int. Cl.
*H01M 2/00* (2006.01)
*H01M 8/04* (2006.01)
(52) U.S. Cl.
CPC ............ *H01M 8/04947* (2013.01); *Y02E 60/50* (2013.01); *H01M 8/04686* (2013.01)
USPC .......................................................... 429/7

(58) Field of Classification Search
USPC .......................................................... 429/7
See application file for complete search history.

(56) References Cited

FOREIGN PATENT DOCUMENTS

| JP | 02-311134 A | 12/1990 | |
|---|---|---|---|
| JP | 2004-235094 A | 8/2004 | |
| JP | 2005-229783 A | 8/2005 | |
| JP | 2006-139972 A | 6/2006 | |
| JP | 2007-318938 A | 12/2007 | |
| JP | 2009-027888 A | 2/2009 | |
| JP | 2009027888 A * | 2/2009 | ................ B06L 3/00 |

\* cited by examiner

*Primary Examiner* — Karie O'Neill Apicella
(74) *Attorney, Agent, or Firm* — Kenyon & Kenyon LLP

(57) ABSTRACT

A fuel cell system includes a fuel cell, a motor connected to the fuel cell, an FC boost converter which raises the output voltage of the fuel cell to output the voltage to the motor, an inverter, and a controller which controls the fuel cell, the FC boost converter and the inverter. When abnormality occurs in one of the FC boost converter and the inverter, an abnormality signal does not pass through a converter control unit or an inverter control unit but is transmitted to the other device, thereby enabling the stop of both the FC boost converter and the inverter.

1 Claim, 2 Drawing Sheets

FUEL CELL SYSTEM

This is a 371 national phase application of PCT/JP2009/063490 filed 29 Jul. 2009, the content of which is incorporated herein by reference.

TECHNICAL FIELD

The present invention relates to a fuel cell system comprising a fuel cell and a load connected to the fuel cell.

BACKGROUND ART

As a fuel cell system comprising a fuel cell and a load connected to the fuel cell, a system described in Patent Document 1 is known. In the system, the output voltage of the fuel cell is raised by a first DC/DC converter and output to the load. Moreover, when the only output of the fuel cell is supplied, a power necessary for the load runs short. In this case, a power to compensate for the shortage is output from an accumulator to the load via a second DC/DC converter. When the output power of the fuel cell exceeds the power of the load, the power is supplied from the fuel cell to the accumulator through the first and second DC/DC converters to charge the accumulator.

In a control device of the fuel cell system described Patent Document 1, the target power of a motor as the load is calculated. The control device calculates the target voltage of the motor in accordance with the target power thereof, to calculate the target output current of the fuel cell. The control device feedback-controls the target output current as the target current of the first DC/DC converter, and feedback-controls the target voltage of the motor as the target voltage of the second DC/DC converter. Moreover, the fuel cell system has an inverter. The inverter converts a direct-current electric power output from the second DC/DC converter into an alternating-current power to output the power to a motor.

PRIOR ART DOCUMENT

Patent Document

[Patent Document 1] Japanese Patent Application Laid-Open No. 2007-318938

SUMMARY OF THE INVENTION

Problem to be solved by the Invention

In a technology described in Patent Document 1, for example, when abnormality occurs in a first DC/DC converter having functions of a power supply source and a boost converter, to stop driving, thereby delaying the stop of an inverter (a motor) as a power consuming device, a large current is extracted from a second DC/DC converter as a normal battery converter. The second DC/DC converter or an accumulator might result in breakdown.

On the other hand, when abnormality occurs in the inverter (the motor) as the power consuming device, to stop the driving, thereby delaying the stop of the first DC/DC converter, a surplus power is not consumed, and a voltage after boost excessively rises. The first DC/DC converter might result in breakdown.

Therefore, in a case where the abnormality occurs in the first DC/DC converter as the boost converter of a fuel cell or the inverter, it is necessary to immediately stop not only the device in which the abnormality has occurred but also another device. However, a conventional technology performs such processing of transmitting a signal informing that the abnormality has occurred to a controller which controls the whole fuel cell system, whereby the controller stops units of the system based on the signal. Information processing in the controller is interposed, and hence the units cannot immediately be stopped.

The present invention has been developed to solve such a problem, and an object thereof is to provide a fuel cell system having a constitution in which even when abnormality occurs in a boost converter or an inverter, any breakdown does not occur in another portion.

Means for solving the Problem

A fuel cell system according to the present invention for achieving the above object is a fuel cell system comprising a fuel cell and a load connected to the fuel cell. This fuel cell system comprises a converter which is interposed between the fuel cell and the load and which raises the output voltage of the fuel cell to output the voltage to the load; an inverter which converts a direct-current power output from the converter into an alternate-current power to output the power to the load; and a controller which controls the fuel cell, the converter and the inverter. The converter has a converter control unit which transmits or receives a signal to or from the controller to control the converter. The inverter has an inverter control unit which transmits or receives a signal to or from the controller to control the inverter. When abnormality occurs in one of the converter and the inverter, an abnormality signal to inform the occurrence of the abnormality does not pass through the converter control unit or the inverter control unit but is transmitted to the other device, to stop both of the converter and the inverter.

According to the present invention, when the abnormality occurs in one of the converter and the inverter, the abnormality signal to inform the occurrence of the abnormality does not pass through the converter control unit and the inverter control unit but is transmitted to the other device. The abnormality signal can rapidly be transmitted to the other device without interposing any information processing in the converter control unit, the inverter control unit or the controller. Therefore, when the abnormality occurs in one of the converter and the inverter, both of the converter and the inverter can be stopped substantially simultaneously with the occurrence of the abnormality. Both a power supply source and a power consuming device are immediately stopped, whereby further occurrence of abnormality or further breakdown can be prevented.

Effect of the Invention

According to the present invention, there can be provided a fuel cell system having a constitution in which even when abnormality occurs in a boost converter or an inverter, any breakdown does not occur in another portion.

BEST MODE FOR CARRYING OUT THE INVENTION

Figure 1:
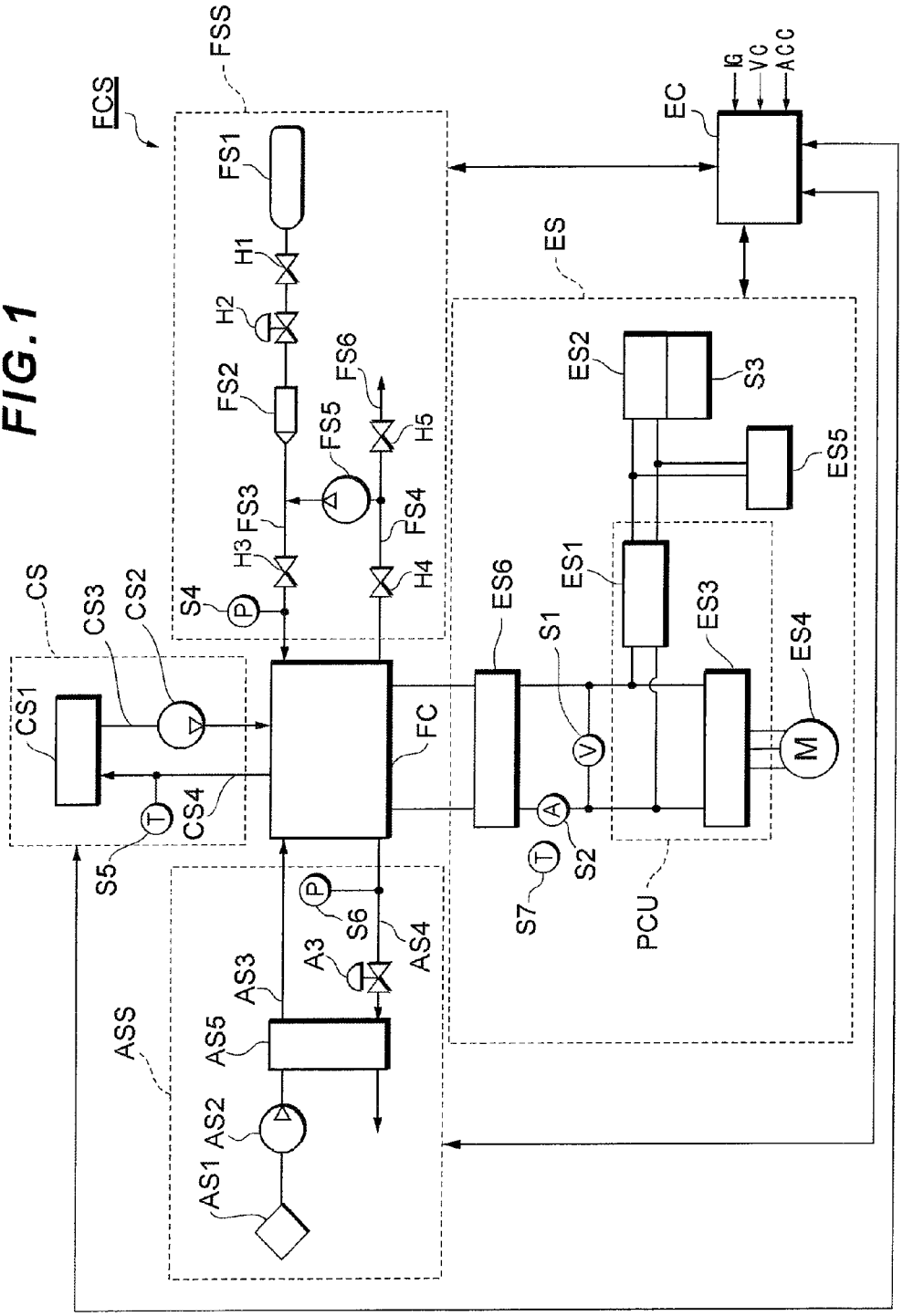
FIG. 1 is a diagram showing a constitution of a fuel cell system according to an embodiment of the present invention.

Hereinafter, an embodiment of the present invention will be described with reference to the accompanying drawings. To facilitate the understanding of the description, the same constituent elements in the drawings are denoted with the same reference numerals wherever possible, whereby redundant description is omitted.

First, a fuel cell system FCS mounted in a fuel cell vehicle according to the embodiment of the present invention will be described with reference to FIG. 1. FIG. 1 is a diagram showing a system constitution of the fuel cell system FCS which functions as a car-mounted power source system of the fuel cell vehicle. The fuel cell system FCS can be mounted in a vehicle such as a fuel cell hybrid vehicle (FCHV), an electric car or a hybrid car.

The fuel cell system FCS comprises a fuel cell FC, an oxidizing gas supply system ASS, a fuel gas supply system FSS, a power system ES, a cooling system CS and a controller EC. The fuel cell FC receives supply of a reactant gas (a fuel gas and an oxidizing gas) to generate a power. The oxidizing gas supply system ASS is a system for supplying air as the oxidizing gas to the fuel cell FC. The fuel gas supply system FSS is a system for supplying a hydrogen gas as the fuel gas to the fuel cell FC. The power system ES is a system for controlling the charging/discharging of the power. The cooling system CS is a system for cooling the fuel cell FC. The controller EC (a control unit) is a controller which generally controls the whole fuel cell system FCS.

The fuel cell FC has a constitution of a solid polymer electrolyte type cell stack in which a large number of cells (unitary cells (power generators) each comprising an anode, a cathode and an electrolyte) are stacked in series. In the fuel cell FC, an oxidizing reaction of formula (1) occurs in the anode and a reducing reaction of formula (2) occurs in the cathode during a usual operation. An electromotive reaction of formula (3) occurs in the whole fuel cell FC.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2 \quad (3)$$

The oxidizing gas supply system ASS has an oxidizing gas flow path AS3 and an oxidizing off-gas flow path AS4. The oxidizing gas flow path AS3 is a flow path through which the oxidizing gas to be supplied to the cathode of the fuel cell FC flows. The oxidizing off-gas flow path AS4 is a flow path through which an oxidizing off-gas discharged from the fuel cell FC flows.

The oxidizing gas flow path AS3 is provided with an air compressor AS2 and a humidifier AS5. The air compressor AS2 is a compressor which takes the oxidizing gas from the atmosphere through a filter AS1. The humidifier AS5 is a humidifier which humidifies the oxidizing gas pressurized by the air compressor AS2.

The oxidizing off-gas flow path AS4 is provided with a pressure sensor S6, a back-pressure regulator A3 and the humidifier AS5. The back-pressure regulator A3 is a valve for regulating the supply pressure of the oxidizing gas. The humidifier AS5 is provided to perform the exchange of water between the oxidizing gas (a dry gas) and an oxidizing off-gas (a wet gas).

The fuel gas supply system FSS has a fuel gas supply source FS1, a fuel gas flow path FS3, a circulation flow path FS4, a circulation pump FS5 and a gas/water discharge flow path FS6. The fuel gas flow path FS3 is a flow path through which the fuel gas to be supplied from the fuel gas supply source FS1 to the anode of the fuel cell FC flows. The circulation flow path FS4 is a flow path for returning, to the fuel gas flow path FS3, a fuel off-gas discharged from the fuel cell FC. The circulation pump FS5 is a pump which forwards under pressure the fuel off-gas in the circulation flow path FS4 to the fuel gas flow path FS3. The gas/water discharge flow path FS6 is a flow path branched and connected to the circulation flow path FS4.

The fuel gas supply source FS1 is constituted of, for example, a high pressure hydrogen tank, a hydrogen storing alloy or the like, and stores the hydrogen gas having a high pressure (e.g., from 35 MPa to 70 MPa). When a shutoff valve H1 is opened, the fuel gas flows out of the fuel gas supply source FS1 to the fuel gas flow path FS3. The pressure of the fuel gas is decreased to, for example, about 200 kPa by a regulator H2 or an injector FS2, and the gas is supplied to the fuel cell FC.

The fuel gas flow path FS3 is provided with the shutoff valve H1, the regulator H2, the injector FS2, a shutoff valve H3 and a pressure sensor S4. The shutoff valve H1 is a valve for shutting off or allowing the supply of the fuel gas from the fuel gas supply source FS1. The regulator H2 regulates the pressure of the fuel gas. The injector FS2 controls the supply amount of the fuel gas to the fuel cell FC. The shutoff valve H3 is a valve for shutting off the supply of the fuel gas to the fuel cell FC.

The regulator H2 is a device which regulates the upstream side pressure (the primary pressure) thereof into a preset secondary pressure. For example, the regulator H2 is constituted of a mechanical pressure reduction valve for reducing the primary pressure and the like. The mechanical pressure reduction valve has a housing in which a back pressure chamber and a pressure regulation chamber are formed with a diaphragm being interposed therebetween. The pressure reduction valve has a constitution in which the primary pressure in the pressure regulation chamber is decreased to a predetermined pressure by the back pressure in the back pressure chamber to obtain the secondary pressure. The regulator H2 can be disposed on the upstream side of the injector FS2 to effectively decrease the upstream side pressure of the injector FS2.

The injector FS2 is an electromagnetic driving type on-off valve in which a valve body can directly be driven by an electromagnetic driving force for a predetermined driving period, and detached from a valve seat to regulate a gas flow rate or a gas pressure. The injector FS2 comprises a valve seat having a jet hole through which a gas fuel such as the fuel gas is jetted, a nozzle body which supplies and guides the gas fuel to the jet hole, and the valve body included and held so as to be movable in an axial line direction (a gas flow direction) with respect to this nozzle body to open and close the jet hole.

The valve body of the injector FS2 is driven by a solenoid which is an electromagnetic driving device, and has a constitution in which the gas jet time and gas jet timing of the injector FS2 can be controlled by a control signal output from the controller EC. To supply the gas at a flow rate required on the downstream side of the injector FS2, the injector FS2 varies at least one of the open area (the open degree) and open time of the valve body provided in the gas flow path of the injector, thereby regulating the flow rate (or the hydrogen molar concentration) of the gas to be supplied on the downstream side.

The circulation flow path FS4 is provided with a shutoff valve H4, and connected to the gas/water discharge flow path FS6. The gas/water discharge flow path FS6 is provided with a gas/water discharge valve H5. The gas/water discharge valve H5 is a valve which operates in accordance with a command from the controller EC to discharge, to the outside, the fuel off-gas including impurities in the circulation flow path FS4, and water. The gas/water discharge valve H5 is opened to lower the concentration of the impurities included in the fuel off-gas in the circulation flow path FS4, whereby the concentration of hydrogen in the fuel off-gas circulated through a circulation system can be increased.

The fuel off-gas discharged through the gas/water discharge valve H5 is mixed with the oxidizing off-gas flowing through the oxidizing off-gas flow path AS4, and diluted by a diluter (not shown). The circulation pump FS5 is driven by a motor to circulate and supply the fuel off-gas in a circulation system to the fuel cell FC.

The power system ES comprises a DC/DC converter ES1, a battery ES2, a traction inverter ES3, a traction motor ES4, auxiliary machines ES5 and an FC boost converter ES6. The fuel cell system FCS has a constitution of a parallel hybrid system in which the DC/DC converter ES1 and the traction inverter ES3 are connected in parallel with the fuel cell FC. The DC/DC converter ES1 and the traction inverter ES3 constitute a power control unit (PCU).

The FC boost converter ES6 is a DC/DC converter having a function of raising the output voltage of the fuel cell FC to output the voltage to the traction inverter ES3 and the traction motor ES4. The DC/DC converter ES1 has a function of raising a direct-current voltage supplied from the battery ES2 to output the voltage to the traction inverter ES3. The DC/DC converter ES1 has a function of lowering a direct-current power generated by the fuel cell FC or a regenerative power collected by the traction motor ES4 by regenerative braking to charge the power into the battery ES2. By these functions of the DC/DC converter ES1, the charging/discharging of the battery ES2 is controlled. Moreover, voltage conversion by the DC/DC converter ES1 is controlled, thereby controlling the operation point (an output terminal voltage and an output current) of the fuel cell FC. A voltage sensor S1 and a current sensor S2 are attached to the fuel cell FC. The voltage sensor S1 is a sensor for detecting the voltage of an output terminal of the fuel cell FC raised by the FC boost converter ES6. The current sensor S2 is a sensor for detecting the output current of the fuel cell FC. Moreover, a temperature sensor S7 for detecting the temperature or a power line is interposed between the boost converter ES6 and the traction inverter ES3.

The battery ES2 functions as a storage source of a surplus power, a regenerative energy storage source during the regenerative braking, or an energy buffer during load fluctuation accompanying the acceleration or deceleration of the fuel cell vehicle. As the battery ES2, for example, a nickel/cadmium accumulator battery, a nickel/hydrogen accumulator battery, or a secondary battery such as a lithium secondary battery is suitable. An SOC sensor S3 for detecting a state of charge (SOC) is attached to the battery ES2.

The traction inverter ES3 is, for example, a PWM inverter driven by, for example, a pulse width modulation system. The traction inverter ES3 converts the direct-current voltage output from the fuel cell FC or the battery ES2 into a three-phase alternate-current voltage in accordance with a control command from the controller EC to control the rotation torque of the traction motor ES4. The traction motor ES4 is, for example, a three-phase alternate-current motor, and constitutes a power source of the fuel cell vehicle.

The auxiliary machines ES5 generically include motors arranged in units of the fuel cell system FCS (e.g., power sources for pumps, etc.), inverters for driving these motors, and various car-mounted auxiliary machines (e.g., the air compressor, the injector, a cooling water circulation pump, a radiator, etc.).

The cooling system CS has a radiator CS1, a cooling solution pump CS2, a cooling solution forward path CS3 and a cooling solution backward path CS4. The radiator CS1 radiates the heat of a cooling solution for cooling the fuel cell FC to cool the solution. The cooling solution pump CS2 is a pump for circulating the cooling solution between the fuel cell FC and the radiator CS1. The cooling solution forward path CS3 is a flow path connecting the radiator CS1 to the fuel cell FC, and is provided with the cooling solution pump CS2. When the cooling solution pump CS2 is driven, the cooling solution flows from the radiator CS1 to the fuel cell FC through the cooling solution forward path CS3. The cooling solution backward path CS4 is a flow path connecting the fuel cell FC to the radiator CS1, and is provided with a water temperature sensor S5. When the cooling solution pump CS2 is driven, the cooling solution which has cooled the fuel cell FC returns to the radiator CS1.

The controller EC (the control unit) is a computer system comprising a CPU, an ROM, an RAM and an input/output interface, and controls the units of the fuel cell system FCS. For example, the controller EC starts the operation of the fuel cell system FCS upon receiving a start signal IG output from an ignition switch. Afterward, the controller EC acquires the demand power of the whole fuel cell system FCS based on an accelerator pedal open degree signal ACC output from an accelerator pedal sensor, a vehicle speed signal VC output from a vehicle speed sensor or the like. The demand power of the whole fuel cell system FCS is a total value of a vehicle running power and an auxiliary machine power.

Here, an auxiliary machine power includes a power consumed by car-mounted auxiliary machines (the humidifier, air compressor, hydrogen pump, cooling water circulation pump, etc.), a power consumed by devices necessary for the vehicle running (a transmission, wheel control device, steering device, suspension device, etc.), a power consumed by devices arranged in a passenger space (an air conditioner, light fixture, audio, etc.) and the like.

Moreover, the controller EC determines the distribution of the output power of the fuel cell FC and the battery ES2. The controller EC controls the oxidizing gas supply system ASS and the fuel gas supply system FSS so that the amount of the power to be generated by the fuel cell FC matches a target power. Moreover, the controller EC outputs a command signal to the DC/DC converter ES1, allows the DC/DC converter ES1 to execute converter control, and controls the operation point (the output terminal voltage and the output current) of the fuel cell FC. Furthermore, the controller EC outputs, for example, alternate-current voltage command values of U, V and W-phases as switching commands to the traction inverter ES3 so as to obtain a target torque in accordance with the accelerator pedal open degree, thereby controlling the output torque and rotational frequency of the traction motor ES4. In addition, the controller EC controls the cooling system CS so that the fuel cell FC has an appropriate temperature.

Figure 2:
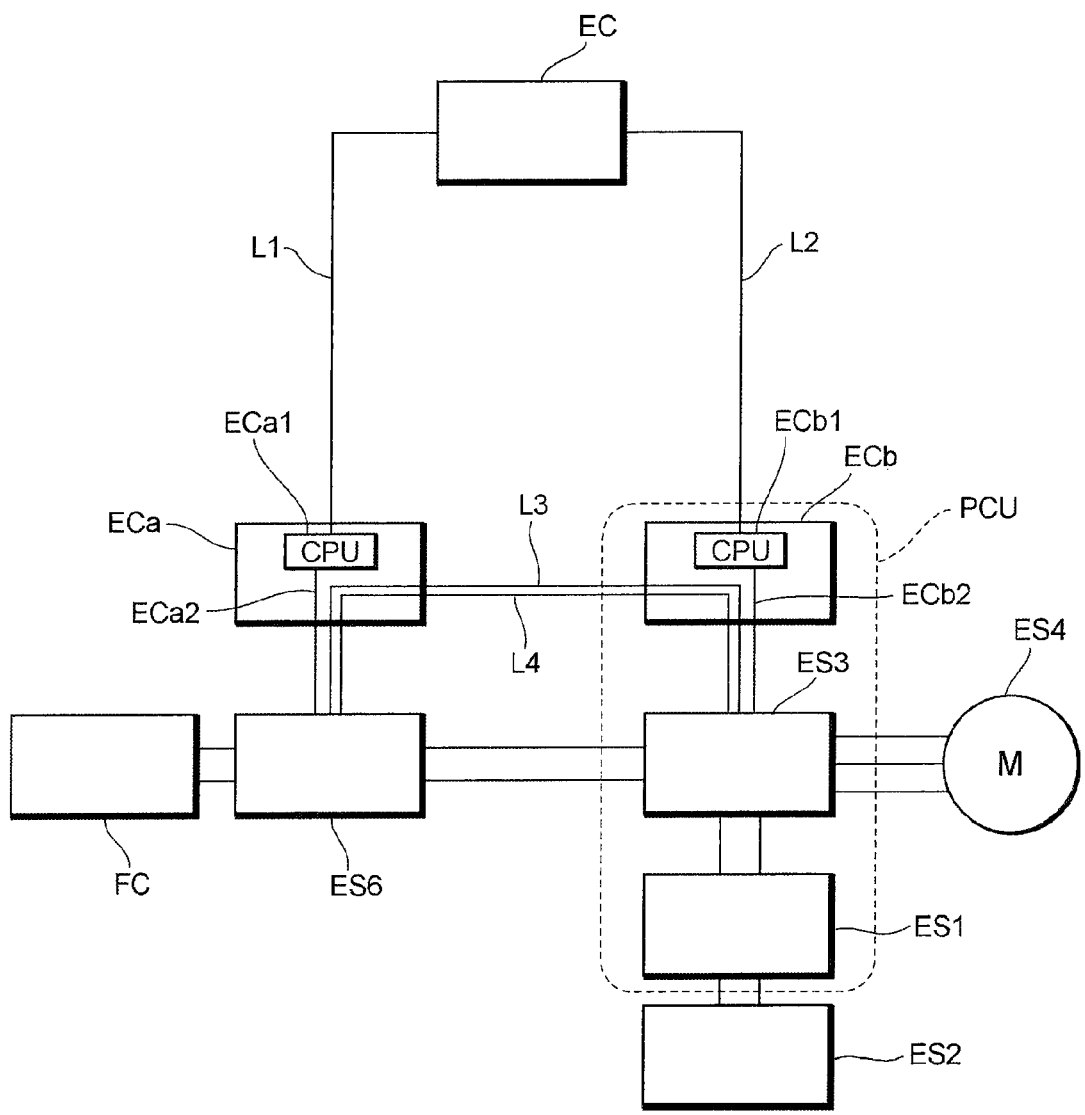
FIG. 2 is a diagram showing a part including an FC boost converter and a traction inverter of the fuel cell system shown in FIG. 1.

Next, there will be described, with reference to FIG. 2, a constitution for immediately stopping both of the FC boost converter ES6 and the traction inverter ES3 when abnormality occurs in one of them. FIG. 2 is a block constitution diagram showing in further detail the part including the FC boost converter ES6 and the traction inverter ES3 of FIG. 1.

As shown in FIG. 2, the FC boost converter ES6 is provided with a converter control device ECa for controlling the FC boost converter ES6. The converter control device ECa comprises a converter control unit ECa1. The converter control unit ECa1 is a central processing unit (CPU), and is connected to the controller EC via a signal line L1. The converter control unit ECa1 is configured to transmit or receive a predetermined control signal to or from the controller EC. Moreover, the converter control unit ECa1 is connected to the FC boost converter ES6 via a signal line ECa2. The converter control unit ECa1 is configured to output the predetermined control signal to the FC boost converter ES6 and to receive a predetermined state signal (the signal indicating the state of the FC boost converter ES6) from the FC boost converter ES6. Therefore, the converter control unit ECa1 functions as a part which transmits or receives the control signal to or from the controller EC to control the FC boost converter ES6.

On the other hand, the traction inverter ES3 is provided with an inverter control device ECb for controlling the traction inverter ES3. The inverter control device ECb comprises an inverter control unit ECb1. The inverter control unit ECb1 is a central processing unit (CPU), and is connected to the controller EC via a signal line L2. The inverter control unit ECb1 is configured to transmit or receive a predetermined control signal to or from the controller EC. The inverter control unit ECb1 is connected to the traction inverter ES3 via a signal line ECb2. The inverter control unit ECb1 is configured to output the predetermined control signal to the traction inverter ES3 and to receive a predetermined state signal (the signal indicating the state of the traction inverter ES3) from the traction inverter ES3. Therefore, the inverter control unit ECb1 functions as a part which transmits or receives the control signal to or from the controller EC to control the traction inverter ES3.

The above constitution is provided with an abnormality signal line L3 and an abnormality signal line L4 in the present embodiment. The abnormality signal line L3 is a signal line which transmits, to the traction inverter ES3, an abnormality signal for informing the occurrence of abnormality, when the abnormality occurs in the FC boost converter ES6. The abnormality signal line L3 extends from the FC boost converter ES6 and is connected to the traction inverter ES3 via the converter control device ECa and the inverter control device ECb. The abnormality signal line L3 passes through the converter control device ECa and the inverter control device ECb but does not pass through the converter control unit ECa1 in the converter control device ECa and the inverter control unit ECb1 in the inverter control device ECb. The abnormality signal line L3 substantially functions as a hardware line which directly connects the FC boost converter ES6 to the traction inverter ES3. Therefore, when the abnormality occurs in the FC boost converter ES6, the abnormality signal for informing the occurrence of the abnormality is not subjected to any information processing but is directly transmitted to the traction inverter ES3. The FC boost converter ES6 and the traction inverter ES3 can substantially simultaneously be stopped.

The abnormality signal line L4 is a signal line which transmits, to the FC boost converter ES6, an abnormality signal for informing the occurrence of abnormality, when the abnormality occurs in the traction inverter ES3. The abnormality signal line L4 extends from the traction inverter ES3 and is connected to the FC boost converter ES6 via the inverter control device ECb and the converter control device ECa. The abnormality signal line L4 passes through the inverter control device ECb and the converter control device ECa but does not pass through the inverter control unit ECb1 in the inverter control device ECb and the converter control unit ECa1 in the converter control device ECa. The abnormality signal line L4 substantially functions as a hardware line which directly connects the traction inverter ES3 to the FC boost converter ES6. Therefore, when the abnormality occurs in the traction inverter ES3, the abnormality signal for informing the occurrence of the abnormality is not subjected to any information processing but is directly transmitted to the FC boost converter ES6. The traction inverter ES3 and the FC boost converter ES6 can substantially simultaneously be stopped.

DESCRIPTION OF REFERENCE NUMERALS

FCS: fuel cell system
FC: fuel cell
ASS: oxidizing gas supply system
AS1: filter
AS2: air compressor
AS3: oxidizing gas flow path
AS4: oxidizing off-gas flow path
AS5: humidifier
A3: back-pressure regulator
CS: cooling system
CS1: radiator
CS2: cooling solution pump
CS3: cooling solution forward path
CS4: cooling solution backward path
FSS: fuel gas supply system
FS1: fuel gas supply source
FS2: injector
FS3: fuel gas flow path
FS4: circulation flow path
FS5: circulation pump
FS6: gas/water discharge flow path
H1: shutoff valve
H2: regulator
H3: shutoff valve
H4: shutoff valve
H5: gas/water discharge valve
ES: power system
ES1: DC/DC converter
ES2: battery
ES3: traction inverter
ES4: traction motor
ES5: auxiliary machines
ES6: FC boost converter
EC: controller
S1: voltage sensor
S2: current sensor
S3: SOC sensor
S4, S6: pressure sensor
S5: water temperature sensor
ACC: accelerator pedal open degree signal
IG: start signal
VC: vehicle speed signal

The invention claimed is:

1. A fuel cell system comprising: a fuel cell; and a load connected to the fuel cell, the fuel cell system further comprising:
   a converter which is interposed between the fuel cell and the load and which raises the output voltage of the fuel cell to output the voltage to the load;
   an inverter which converts a direct-current power output from the converter into an alternate-current power to output the power to the load;
   a controller which controls the fuel cell, the converter and the inverter;
   a converter control unit which transmits or receives a signal to or from the controller to control the converter;
   an inverter control unit which transmits or receives a signal to or from the controller to control the inverter; and an abnormality signal line that connects the converter and the inverter and does not pass through the converter control unit or the inverter control unit,
wherein
when abnormality occurs in one of the converter and the inverter, an abnormality signal to inform the occurrence of the abnormality does not pass through the converter control unit or the inverter control unit but is transmitted via the abnormality signal line to the other of the converter and the inverter, to stop both of the converter and the inverter.

* * * * *